United States Patent [19]
Krueger et al.

[11] 3,969,995
[45] July 20, 1976

[54] APPARATUS FOR MAKING LARGE SIZED BLOCKS OF CHEESE

[75] Inventors: Grant Edward Krueger; Richard John Leitner, both of Green Bay, Wis.

[73] Assignee: Kraftco Corporation, Glenview, Ill.

[22] Filed: Aug. 13, 1973

[21] Appl. No.: 388,101

[52] U.S. Cl. ................................ 99/458; 100/110
[51] Int. Cl.² ........................................ A01J 25/11
[58] Field of Search ............ 99/458, 349, 351, 353, 99/355, 456, 466, 461; 100/104, 110, 116, 191, 250, 265

[56] References Cited
UNITED STATES PATENTS

| | | | |
|---|---|---|---|
| 65,211 | 5/1867 | Greene | 99/458 X |
| 1,418,242 | 5/1922 | Fieldman | 100/116 |
| 2,622,778 | 12/1952 | Poland | 100/265 UX |
| 3,100,712 | 8/1963 | Meeker et al. | 99/458 X |
| 3,355,805 | 12/1967 | Krueger et al. | 100/110 X |

FOREIGN PATENTS OR APPLICATIONS

| | | | |
|---|---|---|---|
| 20,145 | 11/1905 | Sweden | 99/458 |

*Primary Examiner*—Peter Feldman
*Assistant Examiner*—Arthur O. Henderson
*Attorney, Agent, or Firm*—Fitch, Even, Tabin & Luedeka

[57] ABSTRACT

Apparatus for and method of pressing, draining and preparing cheese curd for curing. The apparatus and method are particularly adapted for forming large sized blocks of cheese. Cheese curd is placed in a form for pressing and draining. Blades, in the form of elongated wedges and having slots in their faces are disposed in the curd to uniformly drain the curd while it is being pressed. The blades are removed and the curd is subjected to further conditioning and packaged for curing in containers.

14 Claims, 5 Drawing Figures

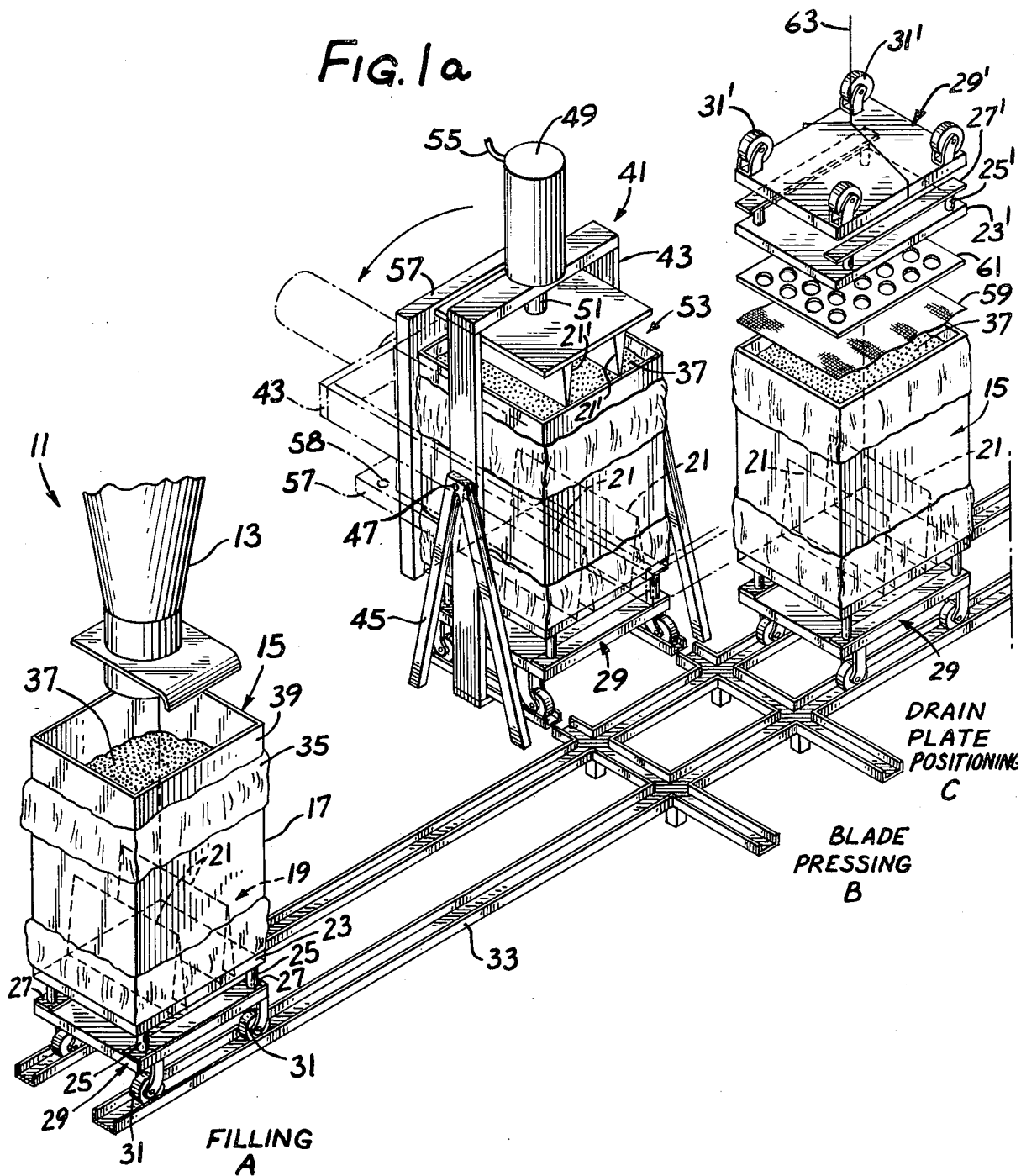

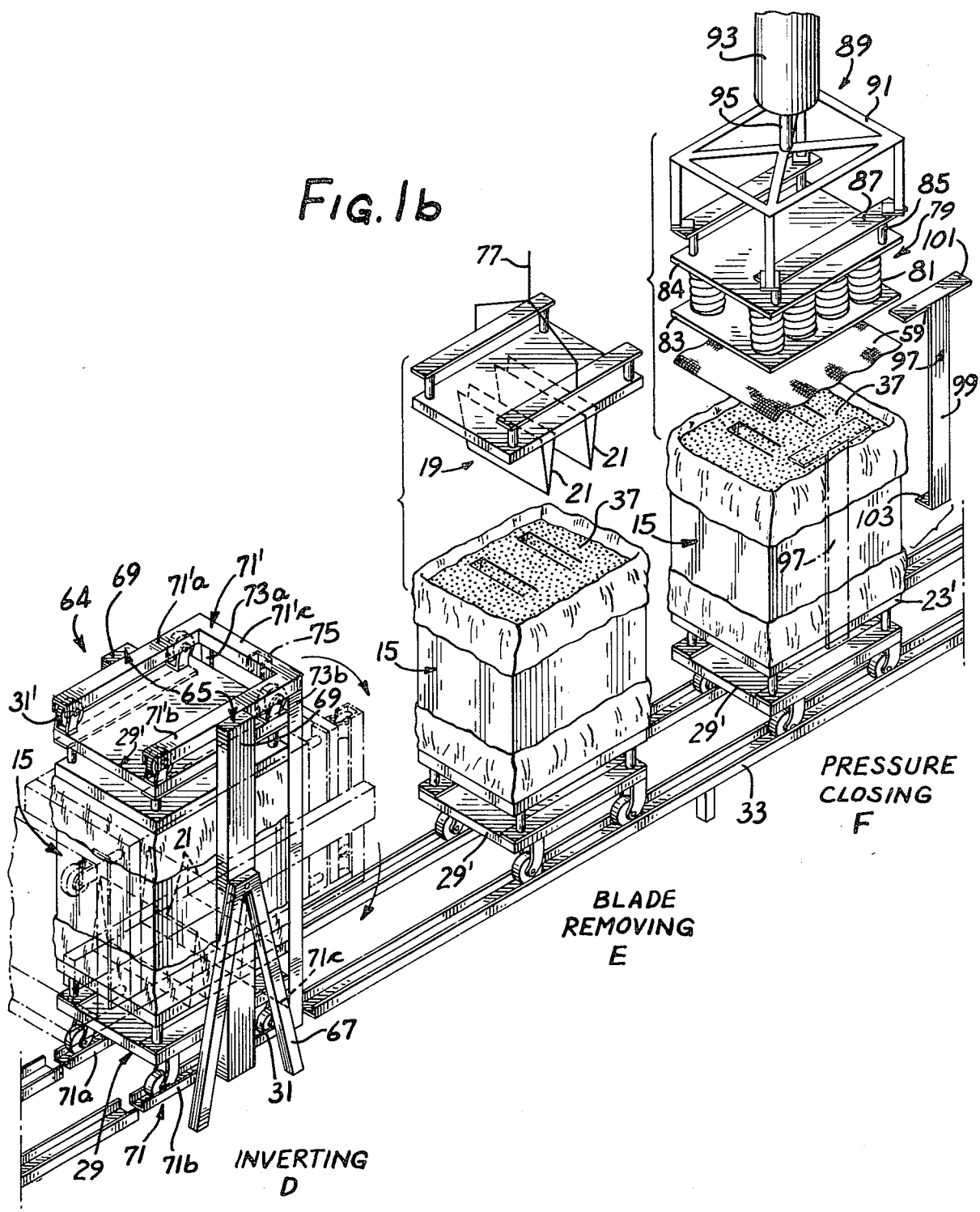

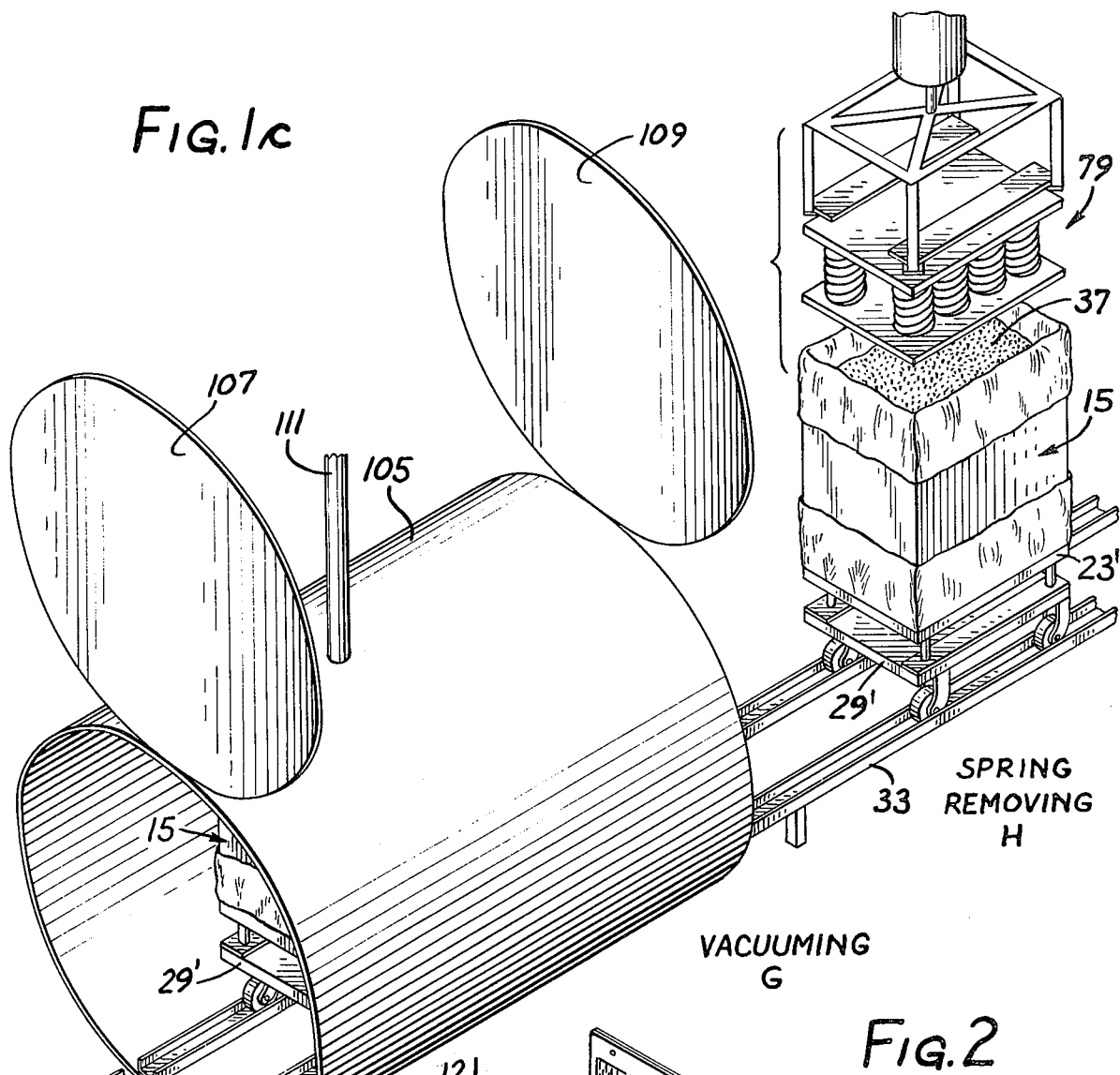
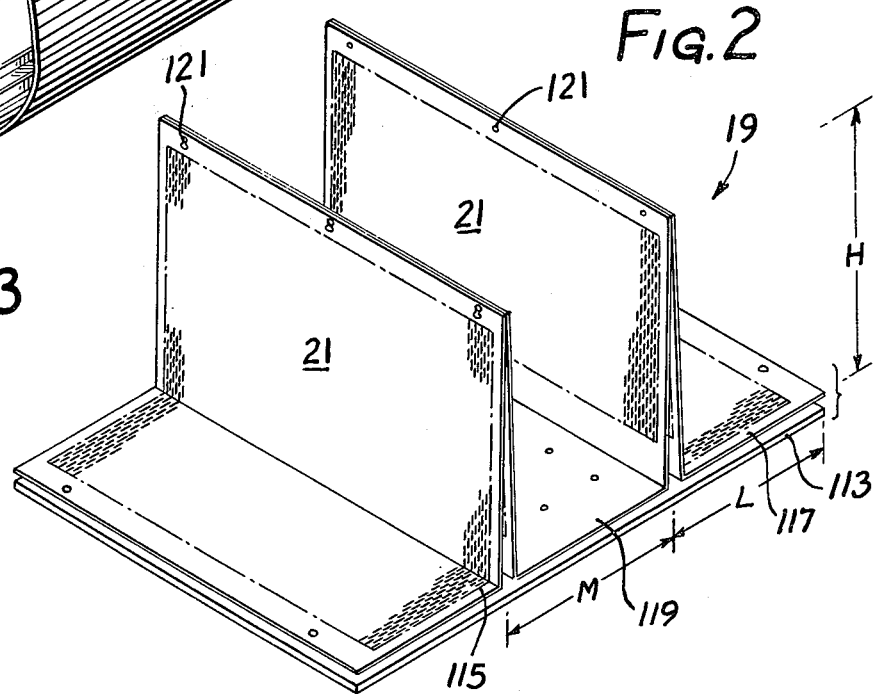
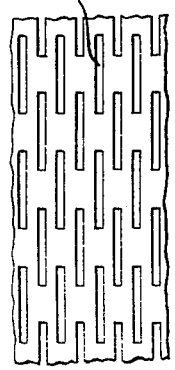

APPARATUS FOR MAKING LARGE SIZED BLOCKS OF CHEESE

The present invention relates generally to cheese manufacture and more particularly it relates to apparatus for the production of large sized blocks of American type natural cheese, such as Cheddar or Colby varieties of cheese.

Natural cheese of the American type manufactured by coagulating ripened milk of proper acidity with rennet, cutting the coagulant and cooking the resulting curd. The whey is drained from the curd, whereupon the curd is pressed and further whey removal is effected. The desired flavor, aroma and texture of the cheese is obtained by curing which involves holding the cheese for a time at desired temperatures.

Natural cheeses have ben produced in a variety of unit sizes. In cheese production, however, it has become desirable to produce large rectangular blocks of cheese which, for example, may weigh approximately 700 pounds, as disclosed in U.S. Pat. No. 3,355,805. These large blocks of cheese can readily be divided and packaged. In producing such large blocks of cheese, it had become the practice to drain the free whey from the curd and then to place the drained curd in a rectangular container for pressing, the sides of which container become part of the box in which the blocks of cheese are ultimately formed and cured. The ends of the container are provided with openings through which the whey drains as the curd is pressed. Thus, it has been known to make large blocks of cheese and drain them during manufacture. Subsequently, the containers have been closed and stored for curing.

In the making of large cheese blocks, it is desirable that the moisture content be uniform throughout the block. It has been known to accomplish the draining and the pressing of the curd with round probes inserted in the curd to assist in the draining of the whey. However, after the removal of these round probes, soft white spots have been left in the curd mass where the curd did not fuse satisfactorily, and moisture variations from point to point within the block have been greater than desired. Various treatments of the curd blocks after draining, and prior to and during curing have not overcome the problem. It has also been known to use a generally V-shaped perforated pressure plate in connection with the pressing of curd, as shown in U.S. Pat. No. 3,404,009. However, this pressure plate was primarily designed to remove air and is not adapted for the manufacture of large blocks of cheese.

Accordingly, it is a primary object of the present invention to provide an improved apparatus for manufacture of cheese, particularly in the form of large blocks.

It is a further object of the present invention to provide apparatus for manufacturing large blocks of cheese with more uniform distribution of moisture and texture throughout the blocks.

These and other objects of the present invention are more particularly set forth in the following detailed description and in the accompanying drawings of which:

FIGS. 1a, 1b, and 1c are each parts of a perspective view showing an apparatus embodying various features of the present invention;

FIG. 2 is a perspective view of blades which are part of the apparatus of the present invention and are shown in FIG. 1; and FIG. 3 is a section of the blades shown in FIG. 2.

The present invention is applicable to high and low moisture natural cheeses, including, but not limited to, Cheddar, Washed Curd, Stirred Curd, Colby, Brick, Muenster and Mozzarella varieties of cheese. The curd provided during the making of these cheeses may be granular curd or milled curd. In the description of the invention which follows, the curd has been separated from whey and is in particulate form ready for pressing and curing.

INTRODUCTION

The process of the invention involves the curd being passed through a series of stations with the assembly and disassembly of apparatus for effecting the desired conditioning of the curd. FIG. 1 of the drawings, shown on three sheets as FIGS. 1a, 1b, and 1c, discloses the curd passing through the series of stations. The curd first enters a filling station A and then passes to a blade assembly pressing station B wherein the curd is pressed with drain blades of novel construction which are inserted into the curd in accord with the invention. The curd then passes to a drain plate positioning station C from which it enters an inverting station D. The curd passes into a blade assembly removing station E whereupon it moves to a pressure closing station F. After the curd is under pressure it enters a vacuuming station G and thereafter enters a spring assembly removing station H. The curd may then be further drained, placed under spring pressure and cured in accord with commercial practices which are not detailed herein.

FILLING STATION A

At the filling station A, the curd is shown being discharged from a cyclone separator 11 through its outlet end 13. The curd is filled into an open ended container 15 which is generally rectangular in cross section and includes side walls 17 made of wood or metal materials. The bottom of the container is provided with a first blade assembly 19 including a pair of blades 21 which extend into the open ended container 15. The blade assembly 19 is carried upon a tray 23 having legs 25 which connect to feet 27. The tray 23 is carried upon a dolly 29 having casters 31 which travel in a track 33 on the floor. The open ended container 15 is provided with a liner 35, usually of a plastic film material, which extends over the top and under the bottom of the walls 17 of the open ended container 15. For convenience in filling the curd, designated 37 in the drawings, into the open ended container 15, an extension 39 is provided at the top of the container so as to guide the curd from the cyclone separator 11 into the open ended container 15. The extension will be removed after the blade pressing station B.

Thus, at the filling station A, an assembled open ended container 15 is provided which is substantially filled with curd 37 and with the blade assembly 19 provided in the bottom to facilitate uniform draining, as will be hereinafter pointed out.

BLADE PRESSING STATION B

The dolly 29 is moved on the tracks 33 to the blade pressing station B whereat it is moved into a press assembly 41 for applying pressure to the curd in the container 15. The press assembly comprises a frame 43 into which the open ended container 15 on the dolly 29 enters. The frame is pivotally mounted on a support stand 45 upon pivot pins 47. At the top of the frame 43 is mounted a piston 49 which connects by means of a rod 51 to a second blade assembly 53. The second blade assembly 53 includes a pair of blades like the blades 21 so that they are similarly numbered and differentiated by the symbol prime ('). The blade assembly 53 is forced into the curd 37 by means of the piston 49. The piston connects by means of a pressure line 55, to a source (not shown) of fluid pressure which fluid may be air or liquid.

The frame 43 of the press assembly 41 is provided with a drain pan 57 which is connected to the frame and which is disposed outwardly of the frame a distance sufficient to accommodate the open ended container 15. The drain pan 57 is in a plane generally parallel to the plane of frame 43 and extends above and below the top and bottom, respectively, of the open ended container 15.

The piston 49 is adapted to provide a pressure, by means of the second blade assembly 53 of about four pounds per square inch to the top of the curd 37. Pressures in the range of between about 2 pounds per square inch and about 5 pounds per square inch may be utilized with wood containers to achieve desired pressing of the curd. Higher pressure may be employed with metal or specially reinforced containers.

The frame 43, after application of pressure by the piston 49, will be tilted 90° to the position shown by the dotted lines in FIG. 1a, thereby causing the drain pan 57 to underlie the open ended container 15 and collect whey which drains from the blade assemblies 19 and 53 located at each end of the container 15. The rotation is about an axis such that the blades 21 and 21' rotate in their own plane and drainage occurs from throughout the curd through the blades 21 and 21'. The drain pan is provided with a suitable opening 58 through which the whey may drain and be collected in a trough or other collector (not shown). The time of draining will vary with the variety of cheese being made. By way of example, a Cheddar curd will be drained in about 30 minutes while a Colby curd can be drained in 15 minutes. Upon completion of the draining of the whey from the curd, the frame 43 is returned to the upright position and the second blade assembly 53 is withdrawn from the curd. As will be more fully described hereinafter, the blades 21 and 21' are so designed as to minimize disruption of the curd mass upon their removal and are configured so as to permit knitting of the curd to provide a cheese block of uniform texture.

The blades 21 and 21' are positioned so as to be spaced from the walls of the container 15 and from one another distances such that the maximum distance which whey must travel transversely is about equal between the walls and the blades, and between the blades. These distances should not be greater than about 10 inches. This spacing of the blades 21 and 21' is important to provide the desired drainage of whey from the curd. The blades 21 on the blade assembly 19 and the blades 21' on the second blade assembly 53 should extend into the curd 37 to such distance that the ends of the blades are in close proximity to one another during draining. This placement of the ends of the blades 21 and 21' in the curd is also important for achieving the desired uniformity of moisture throughout the curd so as to permit the production of a cheese of uniform texture with desired curing characteristics. The design of the blades 21 and 21' is particularly important, as will be hereinafter described in detail. However, the blades 21 and 21' should not divide the curd more than about 1 inch to provide desired curing and texture.

Upon removal of the second blade assembly 53 from the open ended container 15, the dolly 29 is moved out of the press assembly 41 and to the drain plate positioning station C. However, an intermediate pressing of the curd is desirably provided to press any loose curd which may result from removal of the second blade assembly 53. Such intermediate pressing is effected at the pressures provided in the press assembly 41.

DRAIN PLATE POSITIONING STATION C

In the drain plate positioning station C, a press cloth 59 is positioned on top of the curd 37 and a perforated drain plate is placed over the press cloth 59. A second tray assembly 23' like the tray assembly 23 is placed on a perforated plate 61. The second tray assembly 23' has parts corresponding to the tray assembly 23 so corresponding parts are similarly numbered and differentiated therefrom by the symbol prime ('). The tray assembly 23' includes legs 25' and feet 27'. The tray assembly 23' is mounted by a second dolly 29'. These units are mounted on the top of the curd 37 and fit onto the open ended container 15. Suitable carriers 63 may be provided for carrying the dolly 29' and the other units into position for mounting on the open ended container 15.

INVERTING STATION D

The open ended container 15 having the dollies 29 and 29' on the bottom and top, respectively, moves into the inverting station D for rotating the open ended container 15 to turn it upside down. The rotation occurs about an axis in the general plane of the blades 21 thereby causing the separated curd to move together. An inverter 64 is provided which comprises a frame 65 for receiving the open ended container and its associated dollies 29 and 29'. The inverter frame 65 includes a stand 67 which is pivotally connected to vertically extending sections 69 connecting at each end with generally U-shaped sections 71 and 71' which receive the dollies 29 and 29'. the U-shaped sections 71 and 71' each comprise a pair of spaced track sections 71a and 71b which extend generally parallel and which fit within the track 33. The track sections 71a and 71b connect at one end to a base section 71c. The casters 31 and 31' of the dollies 29 and 29' fit into the track sections 71a and 71b of the U-shaped section 71. The bases 71c and 71'c of the U-shaped sections 71 and 71' connect by means of angle irons 73a and 73b located at the corners of the U-shaped sections and are also connected by means of a channel section 75 which further acts as a stop for the open ended container 15 in the inverter frame 65. The inverter frame is rotated 180°, as indicated, in the inverting station D to turn the open ended container 15 upside down and permit it to roll out to the blade removing station E.

BLADE REMOVING STATION E

In the blade removing station E, the first blade assembly 19 is removed from the open ended container by means of a carrier 77. Thus, at the blade removing station, the curd 37 no longer has either the first blade assembly 19 or the second blade assembly 53 in the curd mass. Care should be taken in removing the blade assembly 19 so that the blades 21 come out without undue disturbance of the curd 37.

PRESSURE CLOSING STATION F

In order to properly prepare the curd for further conditioning in accord with the invention, the open ended container 15, having the perforated plate 61 and press cloth 59 in its bottom, is moved to the pressure closing station F. At the pressure closing station F, a press cloth 59' is placed upon the curd and a spring assembly 79 is mounted on the cloth. The spring assembly 79 comprises a plurality of coil springs 81 which are between two plate sections 83 and 84 which provide substantially uniform pressure upon the curd mass. The bottom plate section 83 presses against the curd 37 through the press cloth 59' and the top plate section 84 is connected to legs 85 which have feet 87.

The spring assembly 79 is forced down onto the curd 37 by means of a pressure unit 89 which comprises a pressure distributing frame 91 for applying pressure to the feet 87 of the spring assembly 79. The pressure distributing frame is connected to a piston 93 by means of a rod 95. The piston 93 through the pressure distributing frame 91 forces the spring assembly 79 down onto the curd 37 and T bar clamps 97 are provided for holding the spring assembly 79 under compression against the curd 37. A T-bar clamp 97 is shown in the exploded view at the pressure closing station F and is shown by dotted lines in position on the open ended container 15. The T-bar clamps include a bar section 99 which connects at each end to clamping sections 101 and 103 with clamping section 101 engaging the top plate 84 of the spring assembly 79 and the clamping section 103 connecting to the tray assembly 23'.

The spring assembly 79 by means of the coil springs 81 applies a pressure of about one-half pound per square inch to the curd 37. This pressure should be between about one-quarter pound per square inch and 1 pound per square inch.

The pressure of the spring assembly 79 may be effected by other pressure means such as piston arrangements and rub bars.

VACUUMING STATION G

The curd 37 under pressure of the spring assembly 79 enters the vacuuming station G as shown in FIG. 1c. At the vacuuming station, a partial vacuum is established to provide improved knitting of the curd during the curing of the cheese. The extent of the vacuum and the time of the vacuuming step is varied depending upon the particular variety of cheese and the extent to which it is desired for the cheese to close up during curing. Since Cheddar cheese is desired to have close body characteristics and Colby cheese will have somewhat more open body characteristics, the Cheddar cheese will be subjected to higher vacuum for longer time than the Colby cheese would be subjected. In this connection, good Cheddar cheese body is obtained at a vacuum of about 2 inches of mercury absolute in about 1 hour whereas the desired Colby cheese body is obtained at about 15 inches of mercury absolute in about 15 minutes.

The vacuuming apparatus is shown generally schematically in FIG. 1c as comprising a cylindrical chamber 105 which has closures 107 and 109 at each end. The chamber 105 communicates with a source of vacuum (not shown) through a line 111. The closures 107 and 109, of course, close over the tracks 33 to provide a seal. The chamber is of sufficient size to accommodate the open ended container 15 and can be of such size as to hold more than one open ended container 15. After the vacuum conditioning of the curd, the open ended container is removed from vacuuming station G on the tracks 33.

The vacuuming of the curd is correlated to the pressing and handling steps preceding the vacuuming station G. The combination of the pressing and handling steps with the vacumm step provides the knit and texture desired for the variety of cheese being manufactured.

SPRING REMOVING STATION H

At the spring removing station H, the spring assembly 79 is removed from the open ended container 15 so that it is then ready for closing and storing for the curing period desired for the particular variety of cheese. However, before final closure, the dolly 29' and tray assembly 23' are removed from the container 15 and in effecting such removal and closing, the curd is subjected to a pressure of about one-half pound per square inch and is then permitted to drain for an additional 30 to 45 minutes. During final closing of the open ended container 15, rotation is again provided about an axis generally in the plane of the openings in the curd made by the blades 21 and 21', and intermediate pressing is provided to maintain the curd 37 in compacted condition. Upon final closing of the container 15 a spring assembly is provided in the container to maintain the curd during curing under a pressure of between about one-quarter pounds per square inch and about 1 pound per square inch with a pressure of about one-half pound per square inch being preferred for achieving suitable knitting of the curd during curing.

The rotation of the container about an axis in the plane of the openings caused by the blades 21 and 21' is believed important in achieving uniform texture throughout the cheese which is provided.

BLADE ASSEMBLY

Now to consider the blade assemblies 19 and 53 in greater detail, reference is particularly made to FIGS. 2 and 3 of the drawings. The blade assemblies 19 and 53 are generally similar although one provides the bottom of the container 15 during filling and the other is associated with the press assembly 41. Each blade assembly is made out of perforated metal sections, preferably of stainless steel so as to avoid any problems of corrosion. The blade assemblies include a generally rectangular frame 113 to which are attached the blades 21. The frame 113 may be attached to the press assembly 41 or may be placed in the tray 23. The blades 21 are generally V-shaped and are shown in the drawings as built up from generally L-shaped sections 115 and 117 which are interconnected by a generally U-shaped section 119. The upstanding ends of the L-shaped sections 115 and 117 are bolted to the upstanding ends of the U-shaped section 119 by bolts or rivets 121.

The base of the L-shaped sections 115 and 117 and the base of the U-shaped section 119 are spaced apart a maximum distance of about 2 inches so that the open end of the V-shaped blades is only spread apart about 2 inches. It is most preferable to have the spacing 1 inch or less. As has been heretofore pointed out, it is important that the blades 21 not spread the curd any more than about 2 inches, and preferably not more than 1 inch if desired knitting and curing of the curd is to be achieved. The spacing of the base of the L-sections 115 and 117 from the base of the U-shaped section 119 provides an angle of about 5° between the upstanding sections. Such angle between the sides of the blades 21 should not exceed about 10° to provide the desired operation of the method of the invention.

In the illustrated embodiment, the upstanding portions of the L-shaped sections 115 and 117 and the upstanding portions of the U-shaped section 119 are about 14 inches. This is shown at dimension H in FIG. 2. The base portions of the L-shaped sections 115 and 117 are about 9 inches in width and this distance is denoted by the letter L in FIG. 2. The base of the U-shaped section 119, denoted by the letter M in FIG. 2, is about 10 inches.

In order to achieve the best results and curd which will knit together for satisfactory curing, the L-shaped sections 115 and 117 and U-shaped section 119 are fabricated to provide perforations of particular conformation and a section is shown in detail in FIG. 3. The blade perforations comprise a plurality of elongated openings 123 which are disposed in staggered relation in the blades 21. These elongated openings should extend in the direction of insertion and removal of the blade assemblies 19 and 53. It is important that the width of the openings 123 be of such dimension as to limit any passage of curd particles through the blades. The openings should also be sufficiently narrow as not to lock curd particles into the openings 123. It is desirable that the openings be elongated so that upon removal of the blades any curd particles can be substantially wiped from the openings 123 due to the action resulting from removal of the blade assemblies 19 and 53. It will be understood that there can be some variation in the size of the openings 123 to accommodate particular curd varieties and depending upon whether a milled curd or granular curd is being treated. It has been found, however, that satisfactory results can be achieved with both milled curd and granular curd with the openings 123 having a width about three sixty-fourths inch and a length of about one-half inch.

This configuration of the perforations in the blades 21 permits the draining of the curd 37 with subsequent withdrawal without undue disturbance of the curd thereby permitting uniformity of moisture throughout the curd and knitting of the curd without voids or marks appearing in the curd. This is important since the large sized blocks are cut into relatively small pieces in the ultimate packaging of the resulting cheese so that if the knitting and curing are not uniform, there can be wasteage of cheese.

It is believed that the foregoing explanation of method and apparatus of the invention is adequate for its practice by one skilled in the art. Many variations will be apparent to one skilled in the art for accomplishing desired manufacture of differing varieties of cheese. The best method for practicing the invention with Colby or Cheddar cheese curd is described hereinbefore.

The apparatus, hereinbefore described, provides procedures for the handling of curd through the formation of cheese utilizing large block formation with uniformity of knitting and curing. It provides a marked advance in the cheese making art which is provided by the unique apparatus.

The various features of the invention which are believed to be new are set forth in the following claims.

What is claimed is:

1. Apparatus for manufacturing a block of cheese from curd in particulate form, comprising, in combination, an open ended container for holding the curd and having a peripheral configuration substantially identical to the desired block shape of the cheese to be manufactured, blade means including at least one V-shaped blade adapted to extend into said container from one end thereof for direct contact with curd therein, said blade including side walls connected along one corresponding edge of each wall and diverging from the connected edges to define said V-shaped blade, said side walls being perforated generally uniformly over substantially their entire surfaces and being spaced apart at the spaced edges a maximum distance of 2 inches, means for inserting and removing said blade means from within said container, said blade means extending substantially throughout a vertical cross section of said container when inserted therein, whereby insertion of said blade means facilitates drainage of whey from the curd, and subsequent removal of said blade means permits knitting together of the curd to provide a cheese block of uniform texture.

2. An apparatus in accordance with claim 1 wherein said V-shaped blade is spaced a distance from the walls of said container or another blade such that drainage from the curd is within about 10 inches of the blade.

3. Apparatus in accordance with claim 2 comprising at least two of said V-shaped blades, one of which extends into said container from one end and the other of which extends into said container from the other end, said blades being in close proximity to one another at their innermost edges.

4. Apparatus in accordance with claim 2 in combination with a press for receiving said container, said press being rotatable from a vertical position to a horizontal position whereby said container can be turned to drain the curd through the open end of the V-shaped blade, said press including a frame having sections positioned for surrounding said container, and means for pivotally mounting said frame.

5. Apparatus in accordance with claim 4 wherein said press further includes a piston on said frame and connected to a plate for applying a pressure to said curd of at least about 2 pounds per square inch.

6. Apparatus in accordance with claim 5 wherein a perforated V-shaped blade is attached to said piston and said plate.

7. Apparatus in accordance with claim 5 including in combination spring means at one end of said container for closing said container and for holding the curd under pressure, and vacuuming means for containing said container while under pressure of said spring means.

8. Apparatus in accordance with claim 2 including in combination spring means at one end of said container for closing said container and for maintaining a pressure upon the curd.

9. Apparatus in accordance with claim 8 including in combination a vacuum chamber for containing said container while under pressure of said spring means.

10. Apparatus in accordance with claim 1 wherein said perforations in the blades comprise elongated openings extending toward the ends of said container, the openings being proportioned to limited passage of curd particles therethrough in their transverse direction.

11. Apparatus in accordance with claim 10 wherein said perforations are about one-half inches in length and three-sixty-fourths inches in width.

12. In apparatus for manufacturing a block of cheese from curd in particulate form, which apparatus includes an open ended container for receiving the curd, the improvement comprising a drainage blade adapted for insertion into curd disposed within said container. said blade including generally planar side walls connected along one corresponding edge of each wall and diverging from the connected edges to define a V-shaped blade, said side walls being perforated generally uniformly over substantially their entire surfaces and being spaced apart at the spaced edges a maximum distance of about 2 inches.

13. A drainage blade in accordance with claim 12 wherein said perforations are elongated and have their major axes disposed perpendicular to said connected corresponding edges of said side walls, the minor dimensions of the perforations being restricted sufficiently to prevent passage of the particulate curd therethrough.

14. A drainage blade in accordance with claim 13 wherein the elongated openings are about one-half inches in length and about three sixty-fourths inches in width.

* * * * *